(12) United States Patent
Huang

(10) Patent No.: US 8,253,546 B2
(45) Date of Patent: Aug. 28, 2012

(54) MAGNITUDE COMPARATOR, MAGNITUDE COMPARATOR BASED CONTENT ADDRESSABLE MEMORY CELL, AND NON-EQUAL BIN WIDTH HISTOGRAMMER

(75) Inventor: Tsung-Chu Huang, Changhua (TW)

(73) Assignee: National Changhua University of Education, Changhua (TW)

( * ) Notice: Subject to any disclaimer, the term of this patent is extended or adjusted under 35 U.S.C. 154(b) by 15 days.

(21) Appl. No.: 12/954,627

(22) Filed: Nov. 25, 2010

(65) Prior Publication Data

US 2011/0148605 A1    Jun. 23, 2011

(30) Foreign Application Priority Data

Dec. 23, 2009  (TW) ............................... 98144567 A

(51) Int. Cl.
*G05B 1/00* (2006.01)
(52) U.S. Cl. ........................... 340/146.2; 326/54; 326/55
(58) Field of Classification Search ........................ None
See application file for complete search history.

(56) References Cited

U.S. PATENT DOCUMENTS

| 4,749,887 | A | * | 6/1988 | Sanwo et al. | 326/55 |
| 5,294,911 | A | * | 3/1994 | Uchida et al. | 340/146.2 |
| 6,014,074 | A | * | 1/2000 | Park | 340/146.2 |
| 6,292,093 | B1 | * | 9/2001 | Su et al. | 340/146.2 |

* cited by examiner

*Primary Examiner* — Tuan T Lam
(74) *Attorney, Agent, or Firm* — CKC & Partners Co., Ltd.

(57) ABSTRACT

A magnitude comparator for comparing magnitude of a first data and a second data is disclosed. The first data and the second data are both binary data. The magnitude comparator includes many non-least comparator cells and a P-channel transistor. Each of the non-least comparator cells includes a first transistor, a second transistor, a third transistor and a fourth transistor. The drain of the second transistor is electrically connected to the source of the first transistor, and the source of the second transistor is electrically connected to a ground terminal. The third transistor electrically connects the first transistor, and the fourth transistor electrically connects the first transistor and the third transistor. The source of the P-channel transistor electrically connects a supply terminal, the gate of the P-channel transistor electrically connects the ground terminal, and the drain of the P-channel transistor electrically connects the third transistor of the first comparator cell.

2 Claims, 6 Drawing Sheets

MAGNITUDE COMPARATOR, MAGNITUDE COMPARATOR BASED CONTENT ADDRESSABLE MEMORY CELL, AND NON-EQUAL BIN WIDTH HISTOGRAMMER

RELATED APPLICATIONS

This application claims priority to Taiwan Patent Application Number 98144567, filed Dec. 23, 2009, which is herein incorporated by reference.

BACKGROUND

1. Technical Field

The present disclosure relates to a binary magnitude comparator and a binary magnitude comparator based content addressable memory cell.

2. Description of Related Art

A binary number comparator is applied to receive two n-bit binary number, i.e. the compariers $A=(A_{n-1}A_{n-2} \ldots A_1A_0)_2$ and $B=(B_{n-1}B_{n-2} \ldots B_1B_0)_2$, and to output at least one Boolean value to represent at least one of the following magnitude relations: G means A is greater than B, E means A is equal to B, L means A is less than B, LE or $\overline{G}$ means A is not greater than B, GE or $\overline{L}$ means A is not less than B, and GL or $\overline{E}$ means A is not equal to B.

The one bit comparator can be modified by the Karnaugh map or the Mac Klusky algorithm, and usually requires 20 transistors to achieve the logical circuit. As described in T. V. Le. "High-speed magnitude comparator circuit," U.S. Pat. No. 5,281,946, Jan. 25, 1994, the n-bit binary number comparator that can deal more than one bit has to propagate the equality from the most significant bit to the least significant bit, and thus the computation time is increased.

Taiwan patent number 528982 provides a carry look-ahead adder to accelerate the n-bit binary number comparator. However, it requires large circuit area and rises bit carry issue and bit borrow issue.

Except by using the adders to achieve the n-bit binary number comparator, a serial type n-bit binary number comparator and a parallel type n-bit binary number comparator are disclosed. The serial type n-bit binary number comparator requires many pulse cycles to complete the comparison and thus the computation time is increased. The parallel type n-bit binary number comparators, such as the four strings parallels comparator described in U.S. Pat. No. 3,519,347 and the tree structure comparator described in U.S. Pat. No. 7,403,407, suffer the drawback of requiring large circuit area.

FIG. 1 is a circuit of a comparator in U.S. Pat. No. 7,016,931 of the prior. The comparator 100 uses the logic structures 110, 120, 130 to propagate the equality from the source and the ground terminal to the output terminal. Once the bits in higher place are equal to each other and the stack transistors are interrupted, such as the logic structure 120 is interrupted, the relation result decided by the bits in lower place is applied to decide whether the output is pulled down or not. Therefore, each logic structure 120 of the comparator 100 requires merely 15 transistors included to achieve the XOR gate and the NOT gate.

The content addressable memory (CAM) is broadly applied in the quick searching and matching systems such as the computer cache system and the net address look aside interface. The CAM is separated into two categories by the logic function, i.e. the binary CAM (SCAM) and the ternary CAM (TCAM). The CAM is separated into two categories by the structure of the memory cell, i.e. the static random access memory (SRAM) and the dynamic random access memory (DRAM). The SRAM is faster and stable but requires more transistors than the DRAM. No matter which kind of memory cell is selected to collocate the BCAM or the TCAM, the matching mechanism is limited by figuring out the equal or don't care relations of the bits one by one.

As described in U.S. Pat. No. 6,987,683, the stored values are sorted to improve the efficiency when searching an address. However, the circuit requires many transistors since the thresholds, the priorities or the weights have to be determined before searching.

As described in U.S. Pat. No. 7,403,407, the circuit is simplified but still requires 12 transistors to achieve the basic functions, let alone the extra circuit to propagate the equality. As described above, the comparators in prior system suffer many drawbacks such as large circuit area, many required transistors and cannot be embedded into the comparable content addressable memory (CCAM).

SUMMARY

In one embodiment of the disclosure, a magnitude comparator for comparing magnitude of a first data and a second data is disclosed. The first data and the second data are both binary data. The magnitude comparator includes many non-least comparator cells and a P-channel transistor. Each of the non-least comparator cells includes a first transistor, a second transistor, a third transistor and a fourth transistor. The drain of the second transistor is electrically connected to the source of the first transistor, and the source of the second transistor is electrically connected to a ground terminal. The third transistor electrically connects the first transistor, and the fourth transistor electrically connects the first transistor and the third transistor. The source of the P-channel transistor electrically connects a supply terminal, the gate of the P-channel transistor electrically connects the ground terminal, and the drain of the P-channel transistor electrically connects the third transistor of the first comparator cell.

In another embodiment of the disclosure, a magnitude comparator based content addressable memory cell is disclosed. The magnitude comparator based content addressable memory cell includes a bit line, a memory compare cell, a word line and a P-channel transistor. The memory compare cell further includes many non-least comparator cells and a memory cell. The non-least comparator cell further includes a first transistor, a second transistor, a third transistor and a fourth transistor.

The bit line is applied to provide a complement of non-least bit of a first data. The memory cell electrically connects the bit line to store the complement of the non-least bit of the first data, and to provide a non-least bit of a second data. The word line electrically connects the memory cell to enable the memory cell to store the complement of the non-least bit of the first data. The P-channel transistor connects a supply terminal via the source, connects the ground terminal via the gate, and connects the third transistor of the first comparator cell via the drain.

In the other embodiment of the disclosure, a non-equal bin width histogrammer is disclosed. The non-equal bin width histogrammer includes a thermal meter decoder and a magnitude comparator based content addressable memory. The thermal meter decoder is applied to translate a thermal-meter code into a one-hot code. The magnitude comparator based content addressable memory is applied to provide the thermal-meter code. The magnitude comparator based content addressable memory includes a bit line, a memory compare cell, a word line and a P-channel transistor. The features of the magnitude comparator based content addressable memory have been described above.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
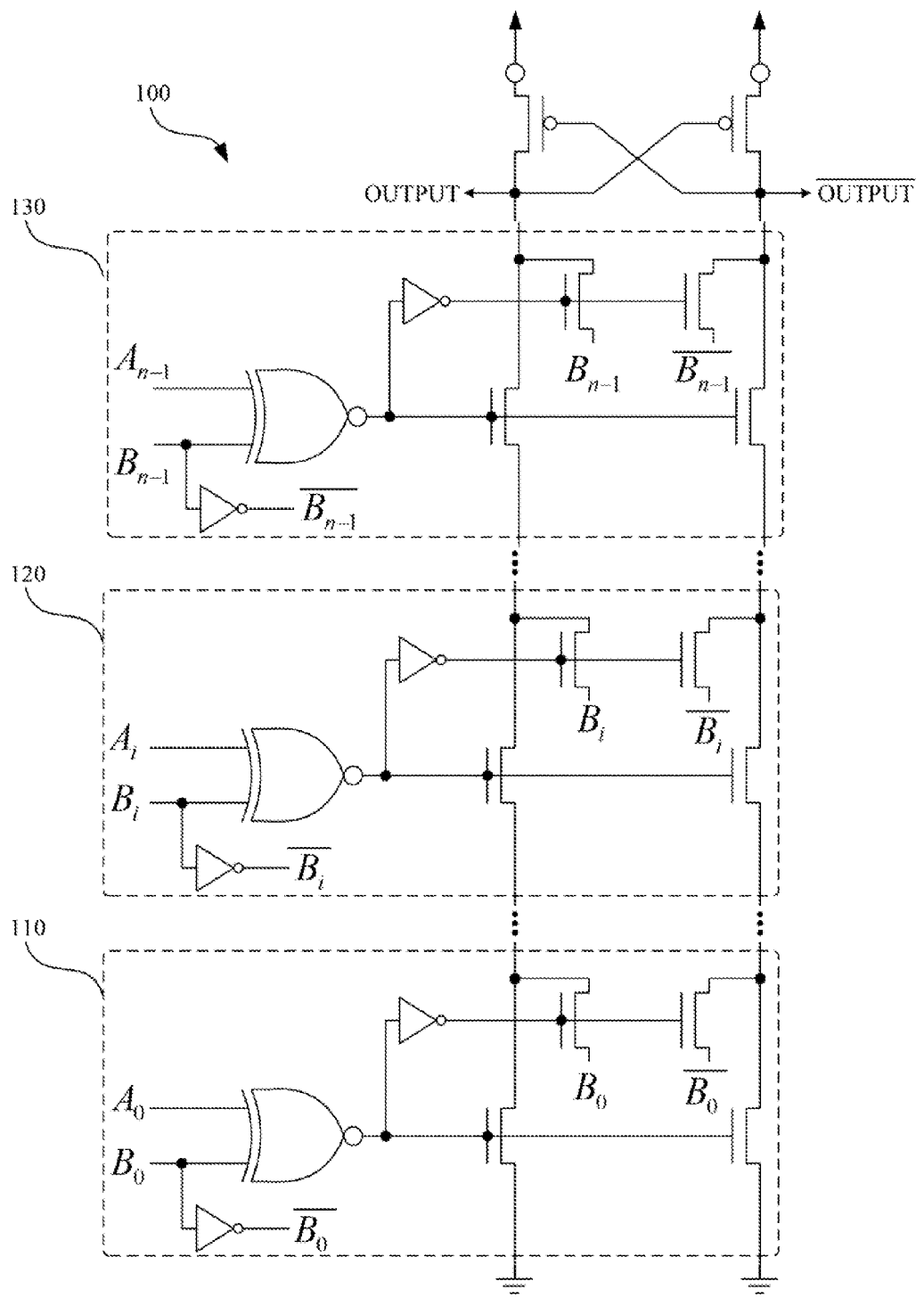
FIG. 1 is a circuit of a comparator of the prior.

The following comparators in the embodiments are assumed to receive two n-bit binary data $A_{n-1:0}=(A_{n-1}A_{n-2}\ldots A_1A_0)_2$ and $B_{n-1:0}=(B_{n-1}B_{n-2}\ldots B_1B_0)_2$ for explanation. The logical relations, such as $G_i=(A_i>B_i)$, $E_i=(A_i=B_i)$ and $L_i=(A_i<B_i)$, and the logical results, such as $G_{n-1:0}=(A_{n-1:0}>B_{n-1:0})$, $E_{n-1:0}=(A_{n-1:0}=B_{n-1:0})$, $L_{n-1:0}=(A_{n-1:0}<B_{n-1:0})$ or their reversal phases, are therefore outputted.

The logical relations $G_i$, $E_i$, $L_i$ and their reversal phases can be illustrated by the following recursive equations $$\begin{cases} L_0 = (A_0 < B_0) \\ L_{i:0} = L_i + E_i L_{i-1:0} \end{cases} (1 \le i \le n-1) \quad (1)$$

Similarly:

$$\begin{cases} G_0 = (A_0 > B_0) \\ G_{i:0} = G_i + E_i G_{i-1:0} \end{cases} (1 \le i \le n-1) \quad (2)$$

The six relations can by illustrated by recursive equations. For instance, the less than relation can be illustrated as following:

$$L_{n-1:0}=L_{n-1}+E_{n-1}(L_{n-2}+E_{n-2}(L_{n-3}+E_{n-3}(\ldots))) \quad (3)$$

Furthermore, L and also be illustrated by A and B, i.e.:

$$L_{n-1:0}=\overline{A_{n-1}}B_{n-1}+(A_{n-1}B_{n-1}+\overline{A_{n-1}}\cdot\overline{B_{n-1}})(\overline{A_{n-2}}B_{n-2}+(A_{n-2}B_{n-2}+\overline{A_{n-2}}\cdot\overline{B_{n-2}})(\ldots)) \quad (4)$$

According to the adsorption law of the Boolean equation, the following equation can be applied for a random value X:

$$\overline{A_{n-1}}B_{n-1}+(A_{n-1}B_{n-1}+\overline{A_{n-1}}\cdot\overline{B_{n-1}})X=\overline{A_{n-1}}B_{n-1}+\overline{A_{n-1}}B_{n-1}X+(A_{n-1}B_{n-1}+\overline{A_{n-1}}\cdot\overline{B_{n-1}})X \quad (5)$$

and thus the equation (4) can be rewritten as following:

$$L_{n-1:0}=\overline{A_{n-1}}B_{n-1}+(\overline{A_{n-1}}+B_{n-1})(\overline{A_{n-2}}B_{n-2}+(\overline{A_{n-2}}+B_{n-2})(\ldots)) \quad (6)$$

Similarly:

$$G_{n-1:0}=A_{n-1}\overline{B_{n-1}}+(A_{n-1}+\overline{B_{n-1}})(A_{n-2}\overline{B_{n-2}}+(A_{n-2}+B_{n-2})(\ldots)) \quad (7)$$

$$\overline{L_{n-1:0}}=(A_{n-1}+\overline{B_{n-1}})(A_{n-1}\overline{B_{n-1}}+\overline{L_{n-2:0}}) \quad (8)$$

$$\overline{G_{n-1:0}}=(\overline{A_{n-1}}+B_{n-1})(\overline{A_{n-1}}B_{n-1}+\overline{G_{n-2:0}}) \quad (9)$$

The logic programming of the above equations (6)-(9) can be achieved by the non-least comparator cells of one embodiment of the disclosure, and the non-least comparator cells requires only four pass transistors.

Figure 2:
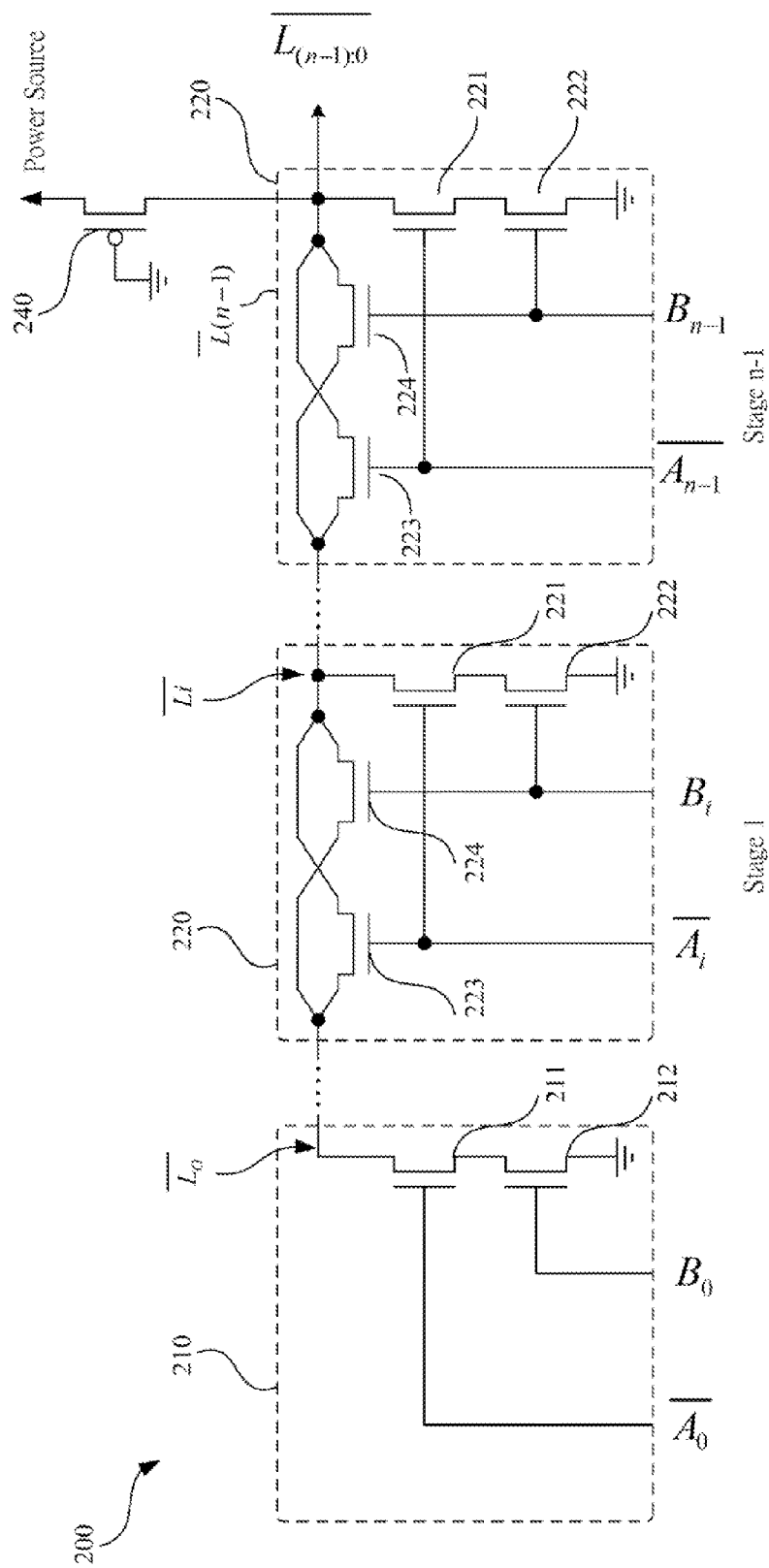
FIG. 2 is a circuit of a comparator of one embodiment of the disclosure.

FIG. 2 is a circuit of a comparator of one embodiment of the disclosure. The comparator 200 is applied to compare the first binary data $A_{n-1:0}=(A_{n-1}A_{n-2}\ldots A_1A_0)_2$ and the second binary data $B_{n-1:0}=(B_{n-1}B_{n-2}\ldots B_1B_0)_2$. The comparator 200 includes many non-least comparator cells 220 connected in series, a least bit comparator cell 210 and a P-channel transistor 240. The P-channel transistor 240 electrically connects a supply terminal via the source, electrically connects the ground terminal via the gate, and electrically connects the first transistor 221 of the non-least comparator cells 220 via the drain and thus to charge the drain of the first transistor 221.

The non-least comparator cells 220 can be applied to deal the most significant bit (MSB) and the non-least bits of a data. Each of the non-least comparator cells 220 includes a first transistor 221, a second transistor 222, a third transistor 224 and a fourth transistor 223 which are both N-channel transistors. The first transistor 221 receives a 1's complement $\overline{A_i}$ of the non-least bit of the first data via its gate, and outputs a complement $\overline{L_i}$ of a middle logic bit via the drain. The second transistor 222 receives a non-least bit $B_i$ of the second data $B_{n-1:0}$ via its gate, electrically connects the source of the first transistor 221 via its drain, and electrically connects to the ground terminal via the source.

The third transistor 224 receives the non-least bit $B_i$ of the second data $B_{n-1:0}$ via its gate, and electrically connects the drain of the first transistor 221 via its own drain. The fourth transistor 223 is parallel connected to the third transistor 224. The fourth transistor 223 receives the complement $\overline{A_i}$ of the non-least bit of the first data $A_{n-1:0}$ via its gate, and electrically connects the drain of the first transistor 221 via its drain. Obviously, the non-least comparator cells 220 of the embodiment saves 9 transistors than the comparator disclosed in U.S. Pat. No. 7,016,931 of the prior.

In the non-least comparator cells 220, the first transistor 221 and the second transistor 222 are applied to achieve the logic equation $A_i+\overline{B_i}$, third transistor 224 and the fourth transistor 223 are applied to achieve the logic equation $A_i\overline{B_i}$, and thus the complement $\overline{L_i}$ of the non-least bit of a logic equation data outputted by the drain of the first transistor 221 is based on the logic equations $A_i+\overline{B_i}$ and $A_i\overline{B_i}$. In detail, the complement $\overline{L_i}$ of the non-least bit of the logic equation data is equal to the complement bit $\overline{L_{i-1}}$ of the previous non-least comparator cell when the complement $\overline{A_i}$ of the non-least bit of the first data is 0 and the non-least bit $B_i$ of the second data is 1.

The least bit comparator cell 210 electrically connects the non-least comparator cells 220, and the least bit comparator cell 210 includes a fifth transistor 211 and a sixth transistor 212. The fifth transistor 211 receives a complement least bit $\overline{A_0}$ of the first data $A_{n-1:0}$ via the gate, electrically connects the non-least comparator cells 220 and outputs a complement least bit $\overline{L_0}$ of the logic equation data via the drain. The sixth transistor 212 receives a least bit $B_0$ of the second data $B_{n-1:0}$ via its gate, electrically connects the source of the fifth transistor 211 via its drain, and electrically connects the ground terminal via its source.

The complement $\overline{L_i}$ of the non-least bit of the logic equation data is equal to the complement least bit $\overline{L_0}$ of the logic equation data when the complement $\overline{A_i}$ of the non-least bit of the first data $A_{n-1:0}$ is 0 and the non-least bit $B_i$ of the second data $B_{n-1:0}$ is 1. For instance, the complement $\overline{L_i}$ of the non-least bit of the logic equation data outputted by the first stage of the non-least comparator cells 220 is equal to the complement least bit $\overline{L_0}$ of the logic equation data when the complement $\overline{A_i}$ of the non-least bit outputted by the first stage of the non-least comparator cells 220 is 0 and the non-least bit $B_i$ is 1. Meanwhile, the first data $A_{n-1:0}$ is larger than or equal to the second data $B_{n-1:0}$ if the complement least bit $\overline{A_0}$ of the first data $A_{n-1:0}$ is 0, and both the non-least bit $\overline{L_i}$ of the logic equation data and the least bit of the logic equation data are 1. In other words, the logic equation $\overline{L_{n-1}}$ is pulled up to 1 by the P-channel transistor 240 to present that the comparing result means larger than or equal to, when anyone of the outputs from the least bit $\overline{L_0}$ of the logic equation to the outputs $\overline{L_{n-1}}$ of the n−1 stages of the non-least comparator cells 220 is not pulled down.

Figure 3:
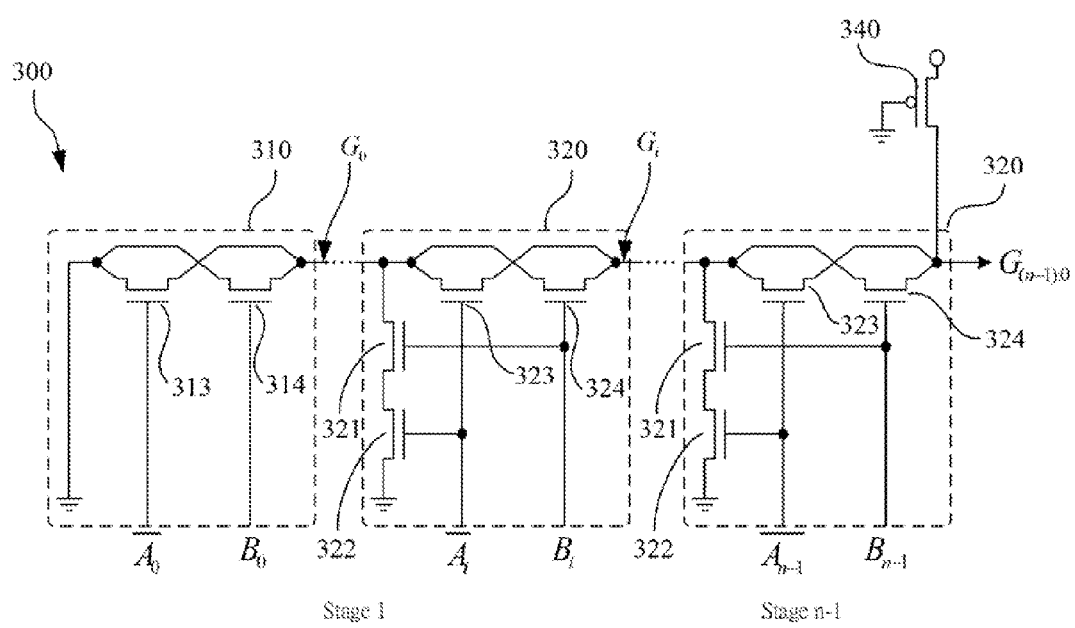
FIG. 3 is a circuit of a comparator of another embodiment of the disclosure.

FIG. 3 is a circuit of a comparator of another embodiment of the disclosure. The comparator 300 is applied to compare the first binary data $A_{n-1:0}=(A_{n-1}A_{n-2} \ldots A_1A_0)_2$ and the second binary data $B_{n-1:0}=(B_{n-1}B_{n-2} \ldots B_1B_0)_2$. Differ from the comparator 200 in FIG. 2, the comparator 300 is applied to achieve the $G_{n-1:0}$ operation, i.e. $A_{n-1:0}>B_{n-1:0}$. It can be illustrated as:

$$G_{n-1:0}=A_{n-1}\overline{B_{n-1}}+(A_{n-1}+\overline{B_{n-1}})(A_{n-2}\overline{N_{n-2}}+(A_{n-2}+\overline{B_{n-2}})(\ldots))$$

The comparator 300 includes many non-least comparator cells 320 connected in series, a least comparator cell 310 and a P-channel transistor 340. The P-channel transistor 340 electrically connects a supply terminal via the source, electrically connects the ground terminal via the gate, and electrically connects the drains of the third transistor 324 and the fourth transistor 323 of the n−1 stage, i.e. the most stage, of the non-least comparator cells 320 via its drain.

The non-least comparator cells 320 can be applied to compare the MSB or the non-least bits of a data. Each of the non-least comparator cells 320 includes a first transistor 321, a second transistor 322, a third transistor 324 and a fourth transistor 323 which are both N-channel transistors.

The first transistor 321 of the first stage of the non-least comparator cells 320 receives the non-least bit $B_i$ of the second data $B_{n-1:0}$ via the gate, and outputs the non-least bit $G_i$ of the logic equation via the drain. The second transistor 322 receives a complement $\overline{A_i}$ of the non-least bit of the first data $A_{n-1:0}$ via the gate, electrically connects the source of the first transistor 321 via its drain, and electrically connects the ground terminal via its source. The third transistor 324 receives the non-least bit a of the second data $B_{n-1:0}$ via the gate, and electrically connects the drain of the first transistor 321 via its source. The fourth transistor 323 connects the third transistor 324 in parallel. The fourth transistor 323 receives the complement $\overline{A_i}$ of the non-least bit of the first data $A_{n-1:0}$ via the gate, and electrically connects the drain of the first transistor 321 and the source of the fourth transistor 323 via its source. The difference between the non-least comparator cells 320 of the embodiment and the non-least comparator cells 220 in FIG. 2 is that first transistor 321 and the second transistor 322 are not connected to the P-channel transistor 340 directly but via the third transistor 324 and the fourth transistor 323. The least comparator cell 310 electrically connects the non-least comparator cells 320, and the least comparator cell 310 includes a fifth transistor 313 and the sixth transistor 314.

The fifth transistor 313 receives the complement least bit $\overline{A_0}$ of the first data $A_{n-1:0}$ via the gate, and electrically connects the non-least comparator cells 320 and outputs the complement least bit $\overline{G_0}$ of the logic equation via the drain. The sixth transistor 314 electrically connects the drain of the fifth transistor 313 via its drain, receives the least bit $B_0$ of the second data $B_{n-1:0}$ via its gate, and electrically connects the ground terminal via its source.

Refer to FIG. 2 and FIG. 3, the other two comparing results, i.e. $\overline{G_{n-1:0}}$ means not larger than and $L_{n-1:0}$ means smaller than, can be realized by exchanging the first data $\overline{A_{n-1:0}}$ and the second data $B_{n-1:0}$, or exchanging the complement data, i.e. $A_{n-1:0}$ and $\overline{B_{n-1:0}}$. Comparing with the comparator disclosed in the U.S. Pat. No. 7,016,931, the comparator of the embodiment saves 9 transistors.

Figure 4:
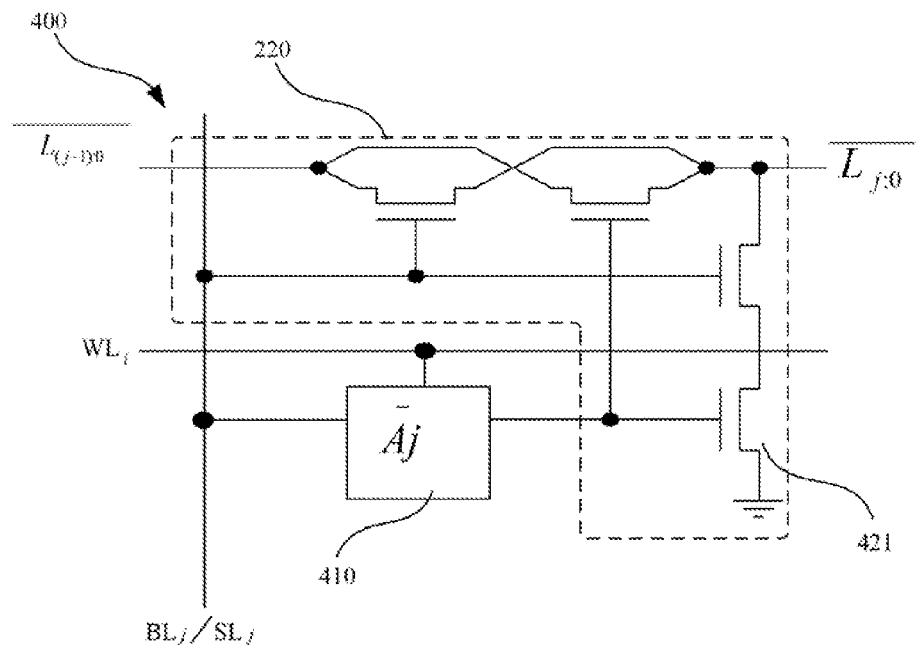
FIG. 4 is a circuit of a memory compare cell of a magnitude comparator based content addressable memory cell of one embodiment of the disclosure.
Figure 5:
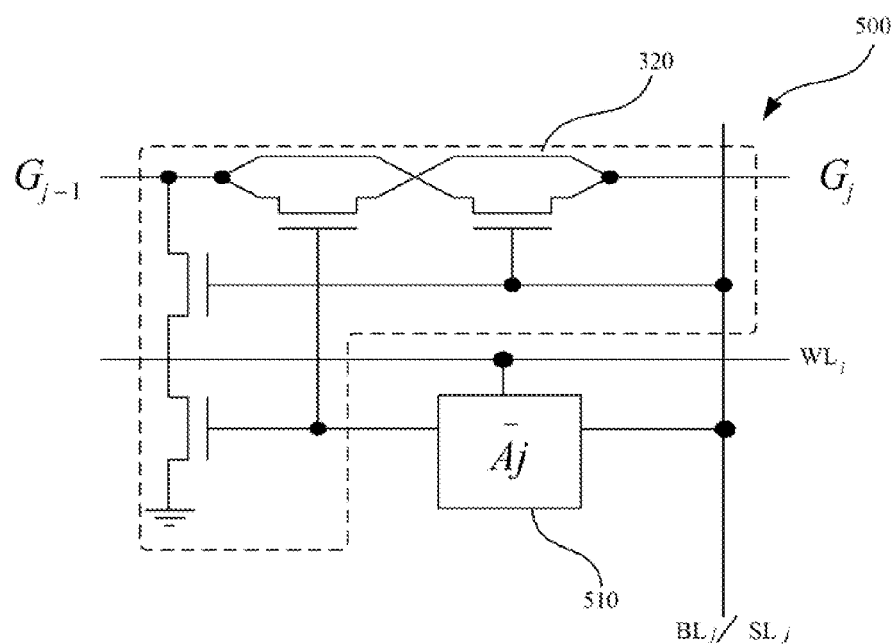
FIG. 5 is a circuit of a memory compare cell of a magnitude comparator based content addressable memory cell of another embodiment of the disclosure.

Refer to FIG. 4 and FIG. 5, they are circuits of a memory compare cell of a magnitude comparator based content addressable memory cell of the embodiments of the disclosure.

The magnitude comparator based content addressable memory cell 400 includes a bit line ($BL_j$), a memory compare cell 410, a word line ($WL_i$) and many non-least comparator cells 220. The $BL_j$ provides a complement $\overline{A_i}$ of the non-least bit of the first data to the non-least comparator cells 220. The non-least comparator cells 220 electrically connect the memory compare cell 410 and the bit line ($BL_j$) and thus being applied to compare the complement $\overline{A_i}$ of the non-least bit of the first data and the non-least bit $B_i$ of the second data. The structure of the non-least comparator cells 220 has been described in FIG. 2.

The memory compare cell 410 electrically connects the bit line ($BL_j$) to store the complement $\overline{A_j}$ of the non-least bit of the first data provided by the bit line ($BL_j$), and thus provides the non-least bit $B_j$ of the second data to the transistor 421. The memory compare cell 410 electrically connects the word line ($WL_i$), and being enabled by the word line ($WL_i$) to store data. The memory compare cell 410 can be achieved by a dynamic random access memory (DRAM) which using a transistor to translate data and using the gate capacitance of the transistor 421 to store data. The memory compare cell 410 also can be achieved by a static random access memory (SRAM) which includes a transistor and using a latch to store data.

The magnitude comparator based content addressable memory cell 500 is similar to that 400 described above. The magnitude comparator based content addressable memory cell 500 uses the non-least comparator cells 320 to execute the operation $G_j$, i.e. $A_j>B_j$.

Figure 6:
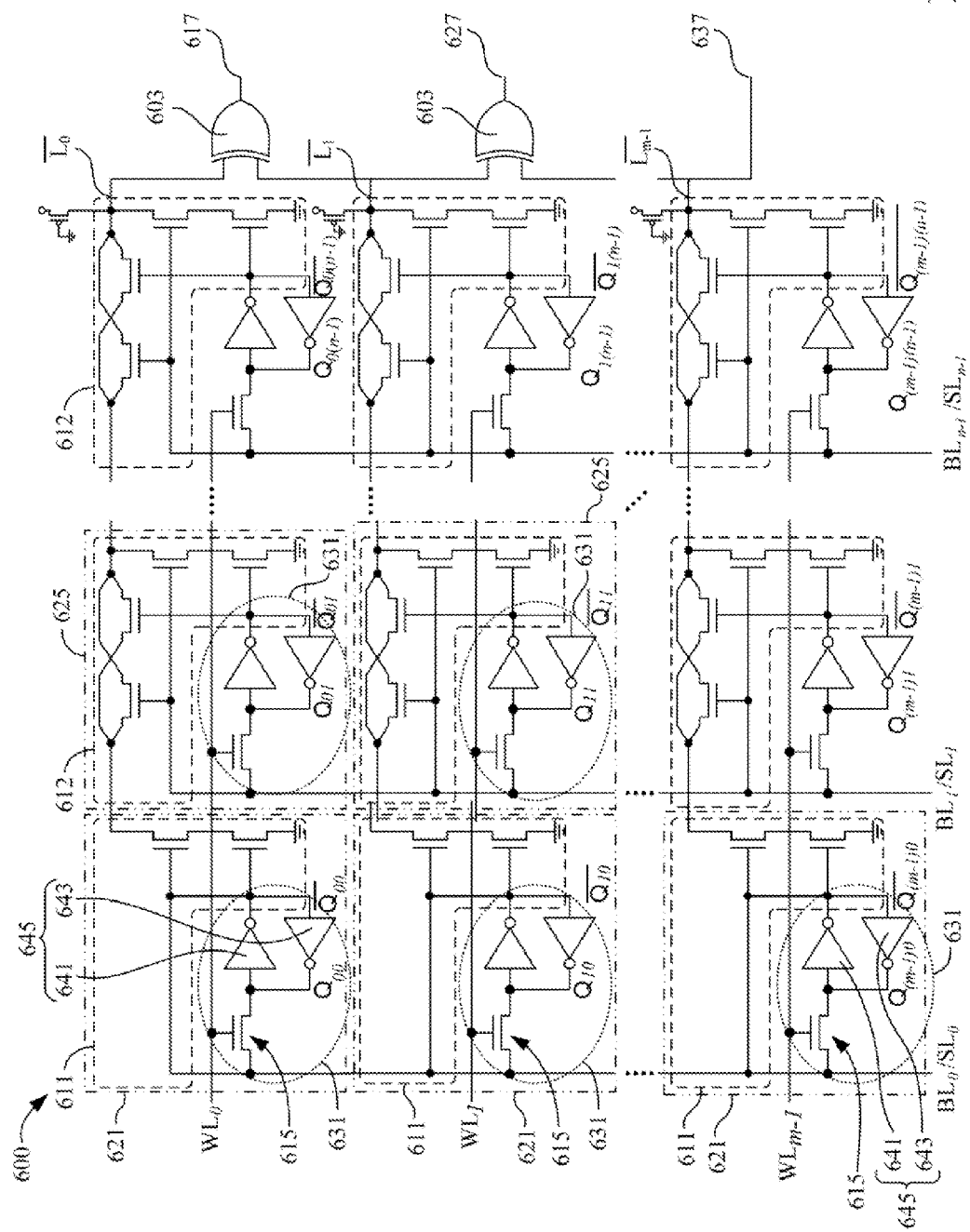
FIG. 6 is a circuit of a magnitude comparator based content addressable memory of one embodiment of the disclosure.

FIG. 6 is a circuit of a magnitude comparator based content addressable memory of one embodiment of the disclosure. The magnitude comparator based content addressable memory 600 is composed by many least bit memory cells 621 and non-least bit memory cells 625. The memory cells 621, 625 include the storage cell 631 and the least bit comparator cell 611 or the non-least comparator cells 612.

When applying the content addressable storage array 600, many threshold values or label values are sorted and inputted into the magnitude memory cells 621 of the content addressable storage array 600. If there exists no repeat threshold values, the thermal code, such as 11 . . . 100 . . 0, will be shown in the complements of the logic equations, i.e. $\overline{L_0}, \overline{L_i} \ldots \overline{L_{m-1}}$, outputted by the non-least comparator cells 612 after the threshold values or label values are compared by the content addressable storage array 600, and thus the comparing results, i.e. the one-hot codes 617, 627, 637 can be outputted by simple logic gates, such as the XOR gate.

The storage cell 631 can be achieved by the dynamic random access memory (DRAM), i.e. the non-inverter 641 and the inverter 643. The storage cell 631 also can be achieved by the static random access memory (SRAM). In FIG. 6, the storage cell 631 is a static random access memory (SRAM) which includes a memory cell switch transistor 615 and a latch 645 to store data and provide the non-least bit $B_i$ of the second data. The memory cell switch transistor 615 electrically connects the word line $WL_i$ and the bit line $BL_j$. The memory cell switch transistor 615 is controlled by the word line $WL_i$ to transmit the complement $\overline{A_i}$ of the non-least bit of the first data carried by the bit line $BL_j$.

The memory cell switch transistor 615 is opened when the word line $WL_i$ carries a high voltage, and the complement $\overline{A_i}$ of the non-least bit of the first data is written to the latch 645 by the bit line $BL_j$. The gate capacitance is applied to store the electric charges when the word line $WL_i$ carries a low voltage. The logic equation $\overline{L_j}$ is decided by the comparing results of the memory cell 621 or 625 in one stage and that in the previous stage.

Figure 7:
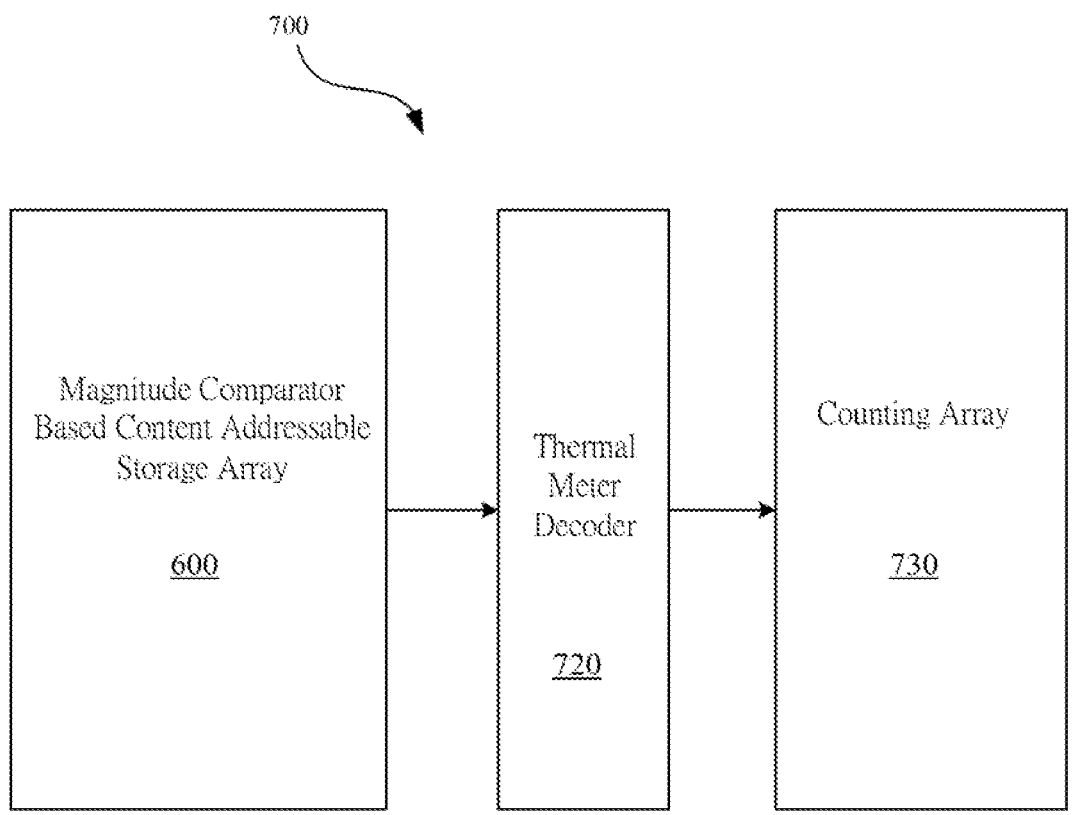
FIG. 7 is a function block of a non-equal bin width histogrammer of one embodiment of the disclosure.

FIG. 7 is a function block of a non-equal bin width histogrammer of one embodiment of the disclosure. The histogrammer with non-equal bin widths 700 includes a thermal meter decoder 720, a magnitude comparator based content addressable memory 600 and a counting array 730. The magnitude comparator based content addressable memory 600 stores data and provides the thermal-meter code based on the data. The thermal meter decoder 720 outputs a comparing result, such as the one-hot code, based on the thermal-meter code. The comparing result triggers the counting array 730 to start counting. The histogrammer with non-equal bin widths 700 decreases the required data volume of the histogram memory and increases the programming speed.

According to embodiments described above, the comparator can be applied in a variety of logic circuits broadly to decrease the required transistors, circuit area and to increase the programming speed when sorting, comparing or dispatching data. The comparator can also be embedded in many circuits to compare the variate threshold values or the non-equal margins, and thus can be applied in the neural network circuit.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A non-equal bin width histogrammer, comprising:
   a thermal meter decoder for translating a thermal-meter code into a one-hot code; and
   a magnitude comparator based content addressable memory for providing the thermal-meter code, the magnitude comparator based content addressable memory comprising:
   a bit line for providing a complement of a non-least bit of a first data;
   a memory compare cell comprising:
      a plurality of non-least comparator cells, each comprising:
         a first transistor having a source;
         a second transistor having a source and a drain, wherein the drain of the second transistor is electrically connected to the source of the first transistor, and the source of the second transistor is electrically connected to a ground terminal;
         a third transistor electrically connected to the first transistor; and
         a fourth transistor electrically connected to the first transistor and the third transistor; and
      a memory cell electrically connected to the bit line for storing the complement of the non-least bit of the first data and for providing a non-least bit of a second data; and
   a word line electrically connected to the memory cell for enabling the memory cell to store the complement of the non-least bit of the first data; and
   a P-channel transistor having a gate, a source, and a drain, wherein the source of the P-channel transistor electrically connected to a supply terminal, the gate of the P-channel transistor is electrically connecting the ground terminal, and the drain of the P-channel transistor is electrically connected to the third transistor of the first comparator cell.

2. The non-equal bin width histogrammer of claim 1, wherein the thermal meter decoder comprises at least an XOR gate electrically connected to the non-least comparator cells of the memory compare cell for decoding the thermal-meter code.

* * * * *